United States Patent [19]

Matsuoka

[11] Patent Number: 5,365,311
[45] Date of Patent: Nov. 15, 1994

[54] IMAGE FORMING SYSTEM COMPRISING AN IMAGE FORMING DEVICE AND VARIOUS OPTIONAL DEVICES CONNECTED TO THE IMAGE FORMING DEVICE

[75] Inventor: Takashi Matsuoka, Yokohama, Japan

[73] Assignee: Kabushiki Kaisha Toshiba, Kawasaki, Japan

[21] Appl. No.: 964,962

[22] Filed: Oct. 22, 1992

[30] Foreign Application Priority Data

Oct. 28, 1991 [JP] Japan .................................. 3-281544

[51] Int. Cl.$^5$ .............................................. G03G 21/00
[52] U.S. Cl. ..................... 355/205; 340/679; 355/309
[58] Field of Search ............. 355/205, 24, 206, 23, 355/207, 208, 308, 309, 203, 204, 200, 209; 340/679; 364/550; 271/9

[56] References Cited

U.S. PATENT DOCUMENTS 5,049,946  9/1991  Harada ................. 355/309
5,063,410 11/1991  Kimoshita et al. ..... 355/204
5,103,259  4/1992  Saitoh et al. .......... 355/206

Primary Examiner—A. T. Grimley
Assistant Examiner—Shuk Y. Lee
Attorney, Agent, or Firm—Foley & Lardner

[57] ABSTRACT

An image forming system including a laser printer and optional devices. The laser printer has a control section. The optional devices each have an upper device switch. Status data items are supplied from the optional devices to the control section. The data generated by the upper device switch of the optional device, showing whether or not the optional device is mounted on the device, is also supplied to the control section. Further, data generated by the upper device switch of the device and showing whether or not the optional device is mounted on the device are supplied to the control section. In addition, status data items are supplied from the optional devices to the control section. Based on the various data items received, the control section determines, with high accuracy, whether or not the optional devices are connected to the laser printer.

10 Claims, 13 Drawing Sheets

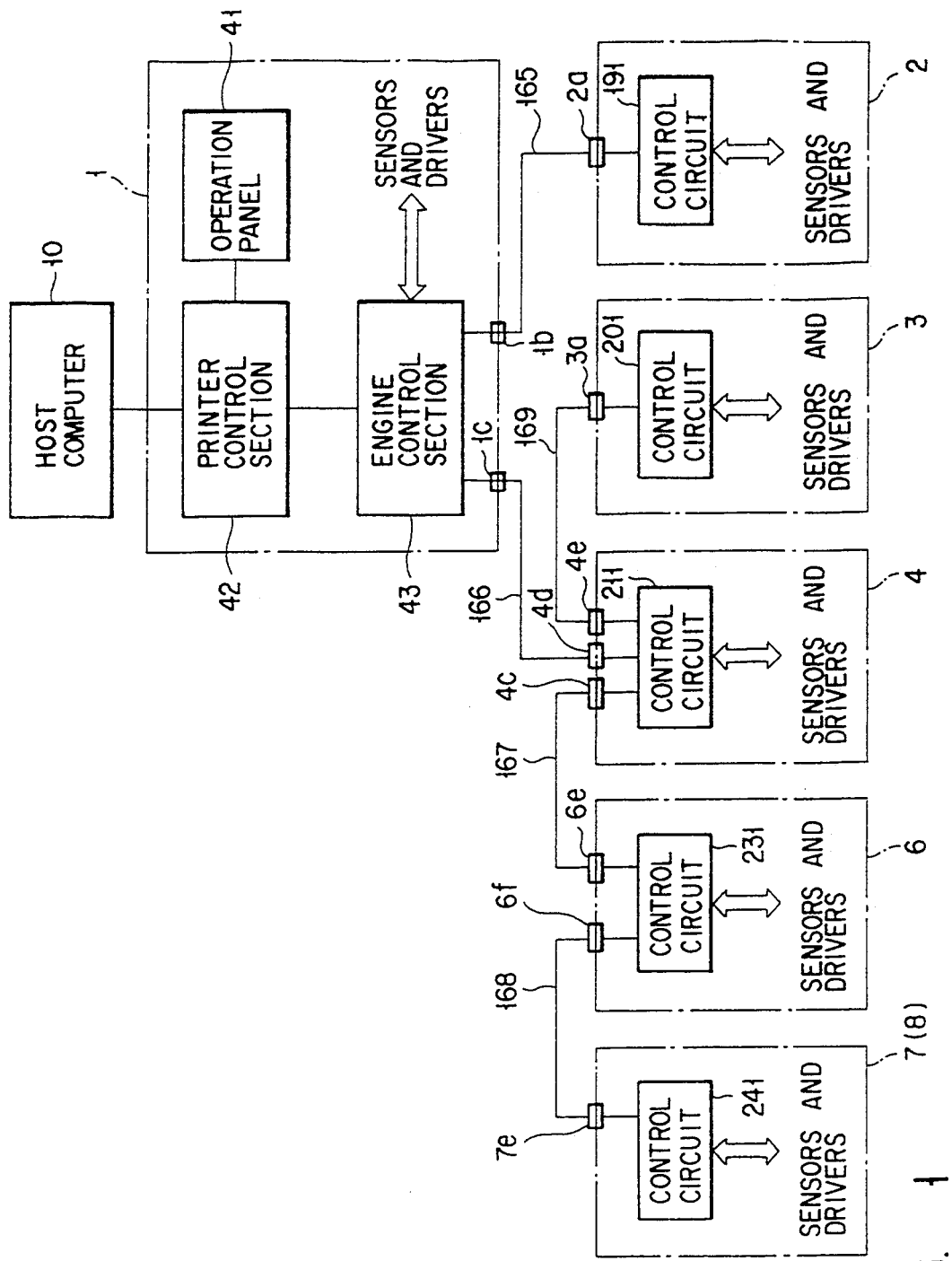
F I G. 1

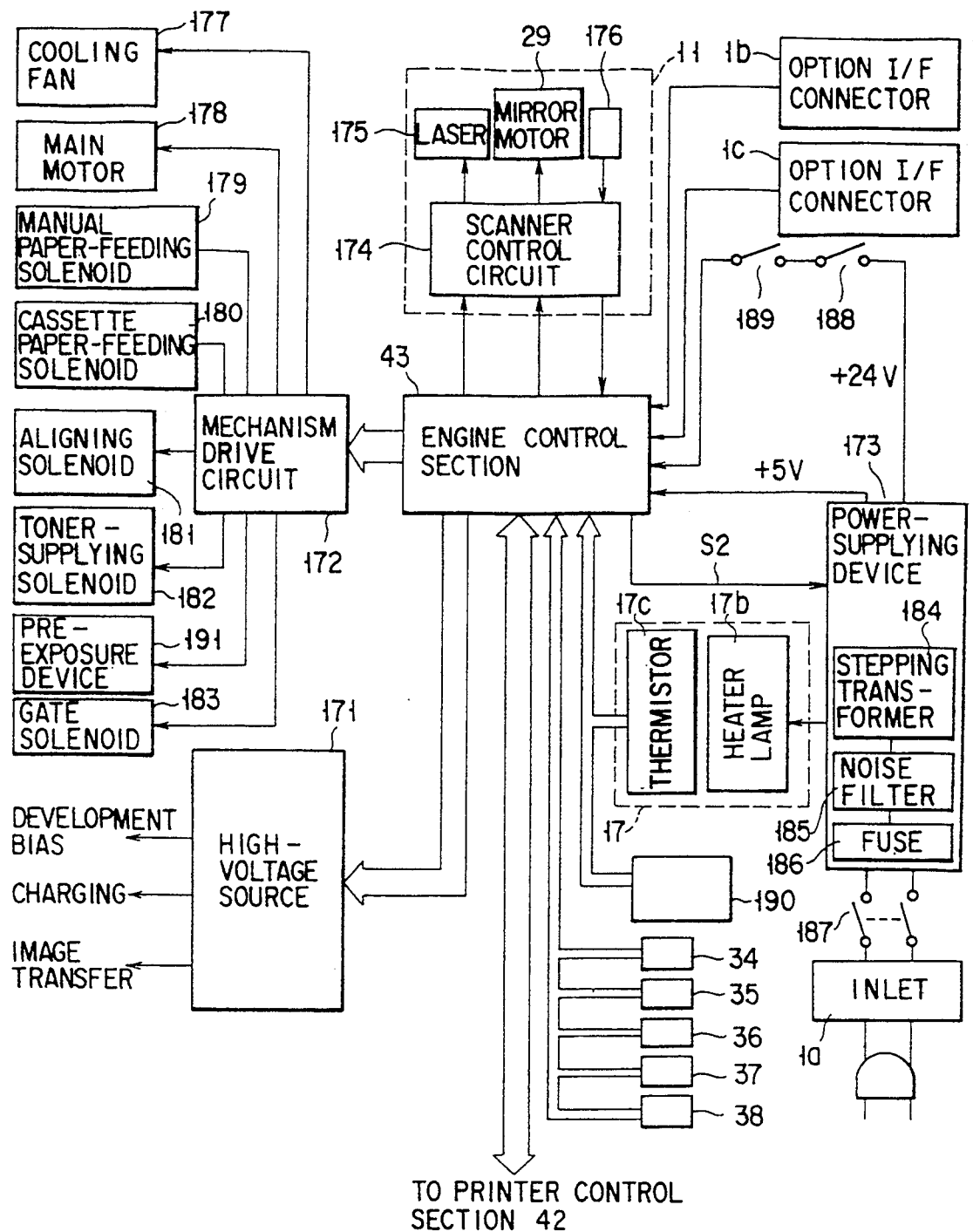
F I G. 5

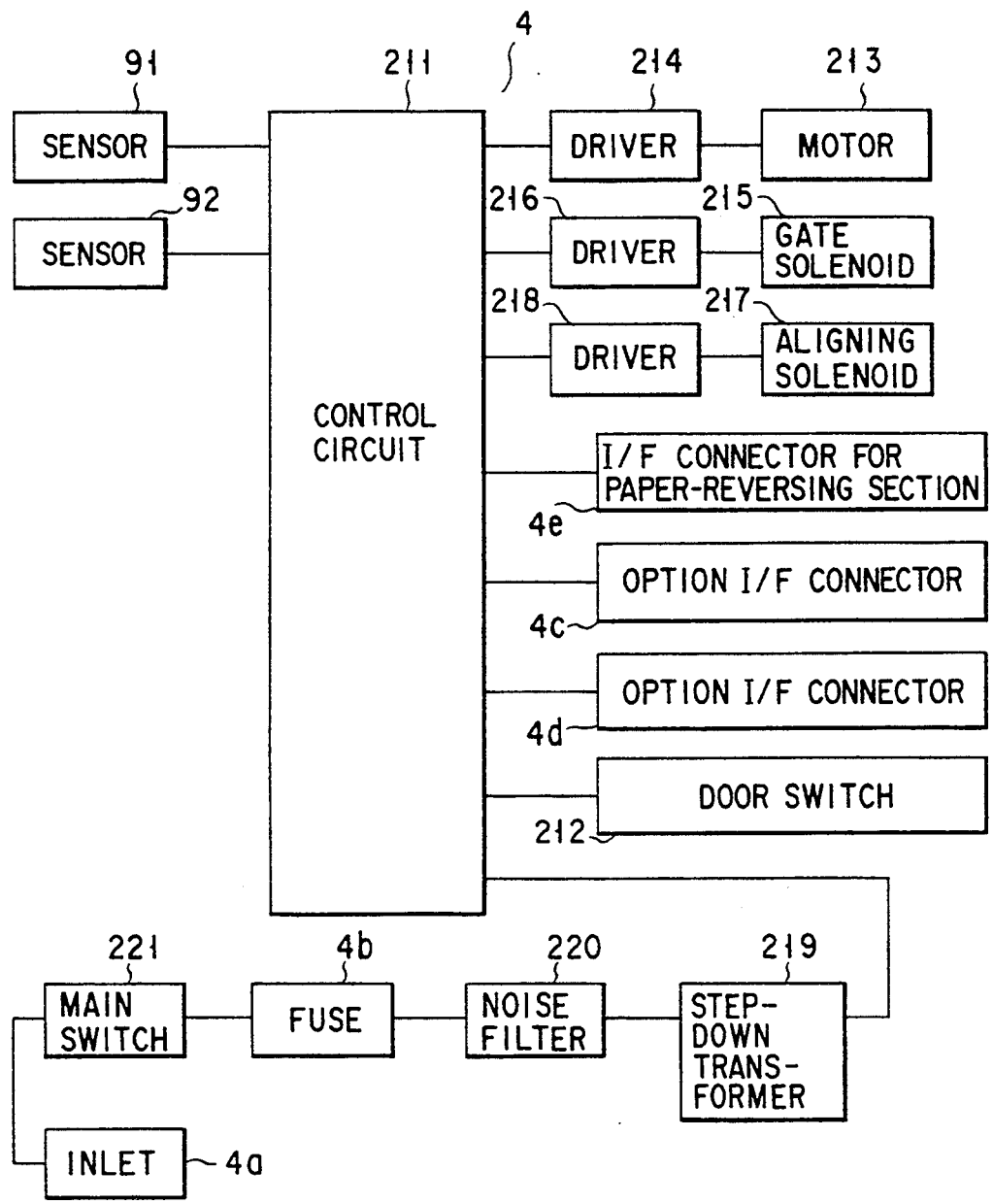
F I G. 8

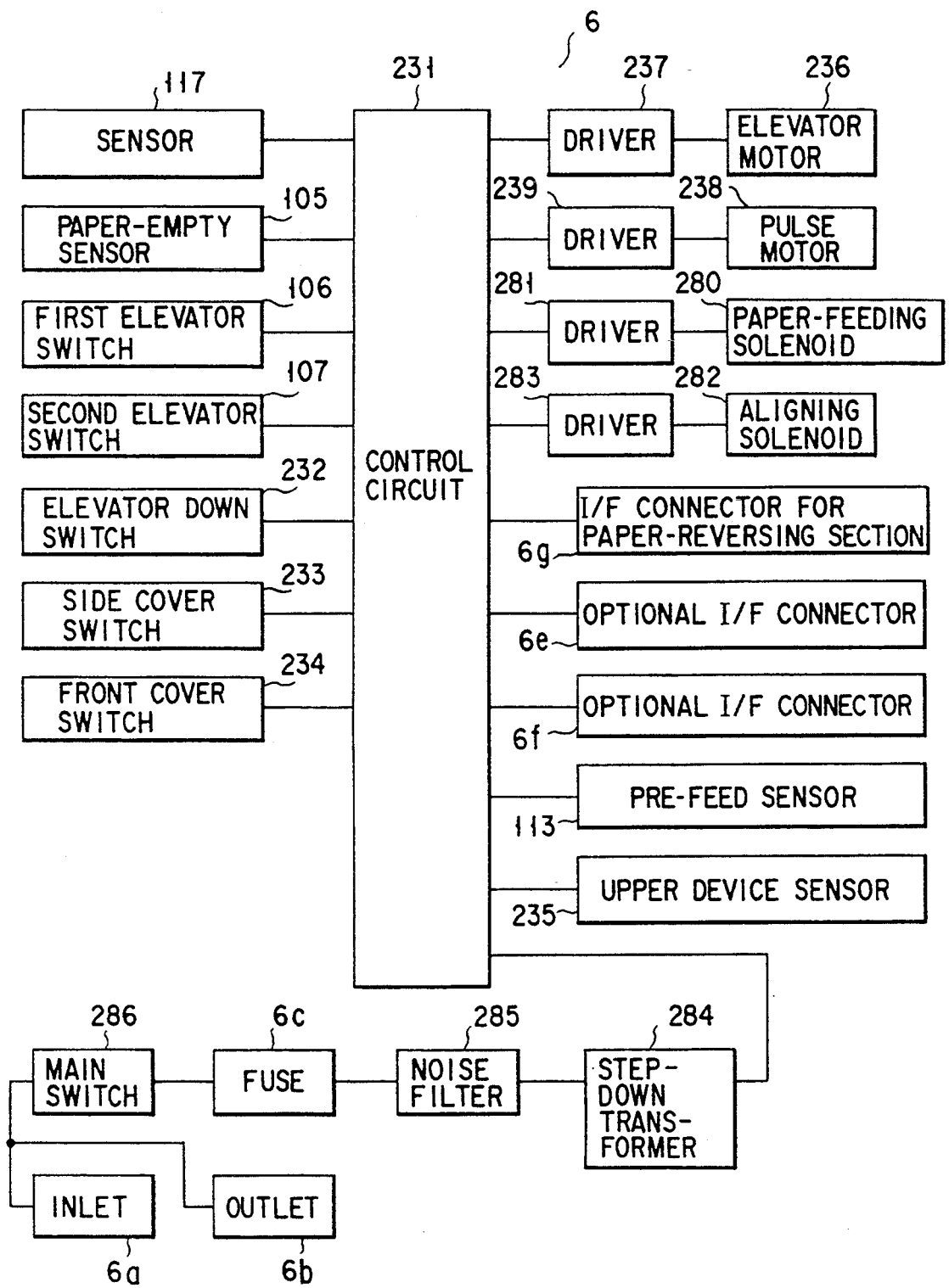
F I G. 9

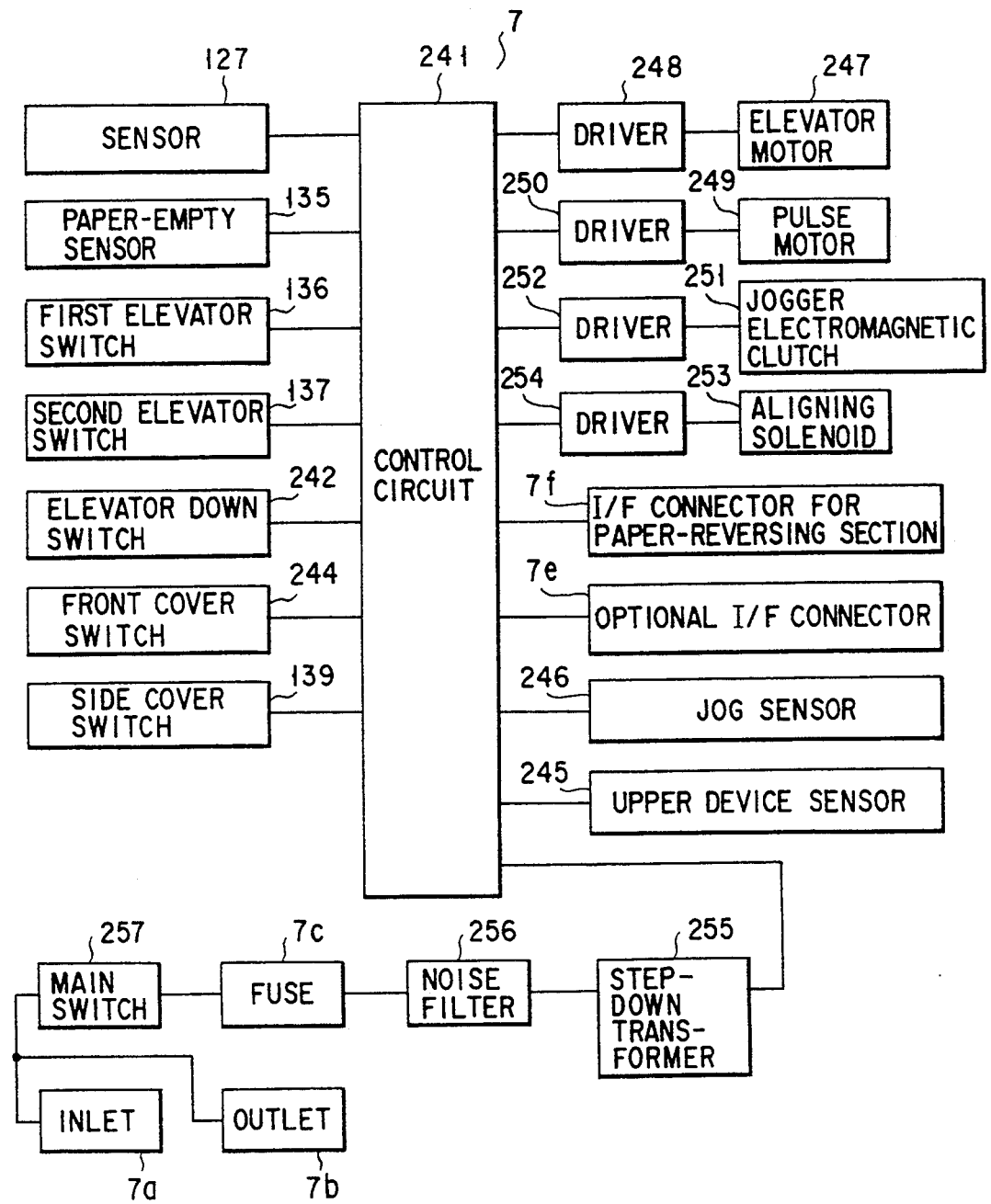
F I G. 10

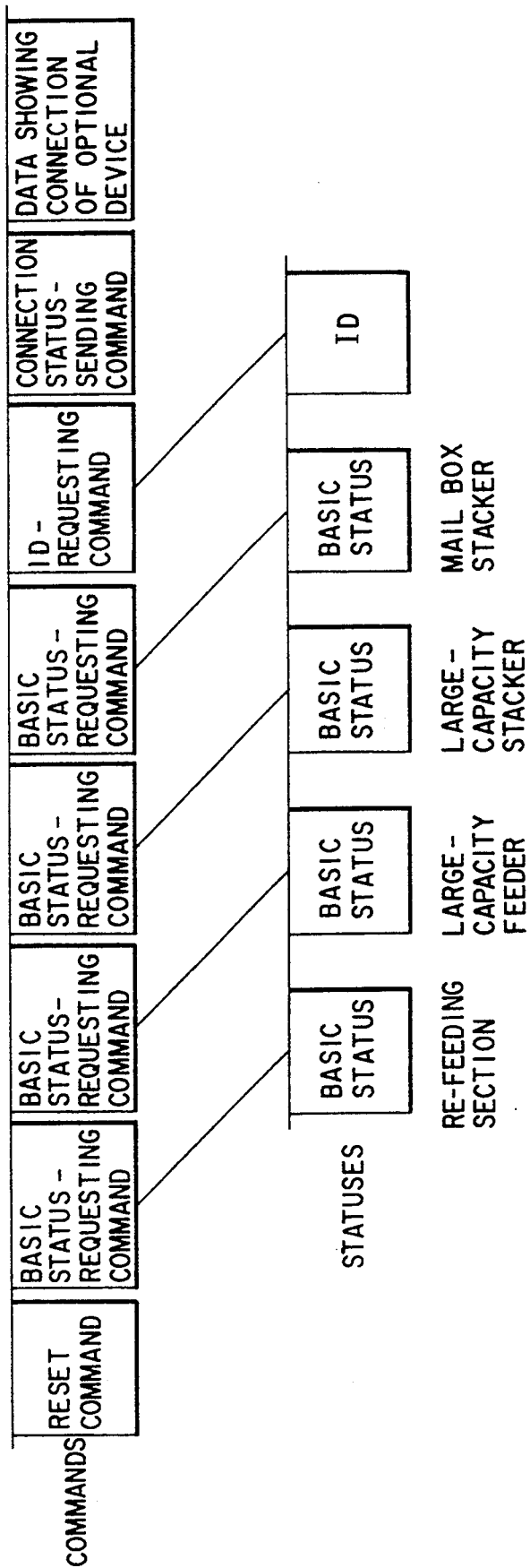
F I G. 12

| CONNECTION STATUS | PAPER-REVERSING SECTION 3 | SORTER 8 | LARGE-CAPACITY STACKER 7 | LARGE-CAPACITY FEEDER 6 | RE-FEEDING SECTION 4 | OPERATION PERFORMED BY THE OPTION DEVICE 24a |
|---|---|---|---|---|---|---|
| # 1 | | | | | x | DISABLED |
| # 2 | | | | x | | ENABLED |
| # 3 | | | | x | x | ONLY LCF ENABLED |
| # 4 | | | x | | | DISABLED |
| # 5 | | | x | | x | DISABLED |
| # 6 | | | x | x | | ONLY LCF ENABLED |
| # 7 | | | x | x | x | ONLY LCF ENABLED |
| # 8 | | x | | | | DISABLED |
| # 9 | | x | | | x | DISABLED |
| # 10 | | x | | x | | ONLY LCF ENABLED |
| # 11 | | x | | x | x | ONLY LCF ENABLED |
| # 12 | | x | x | | | COMBINATION INHIBITED |
| # 13 | | x | x | | x | COMBINATION INHIBITED |
| # 14 | | x | x | x | | COMBINATION INHIBITED |
| # 15 | | x | x | x | x | COMBINATION INHIBITED |
| # 16 | x | | | | | DISABLED |
| # 17 | x | | | | x | ENABLED |
| # 18 | x | | | x | | ENABLED |
| # 19 | x | | | x | x | ENABLED |
| # 20 | x | | x | | | ENABLED |
| # 21 | x | | x | | x | ENABLED |
| # 22 | x | | x | x | | ENABLED |
| # 23 | x | | x | x | x | ENABLED |
| # 24 | x | x | | | | ENABLED |
| # 25 | x | x | | | x | ENABLED |
| # 26 | x | x | | x | | ENABLED |
| # 27 | x | x | | x | x | ENABLED |
| # 28 | x | x | x | | | COMBINATION INHIBITED |
| # 29 | x | x | x | | x | COMBINATION INHIBITED |
| # 30 | x | x | x | x | | COMBINATION INHIBITED |
| # 31 | x | x | x | x | x | COMBINATION INHIBITED |

F I G. 13

| BIT 8 | BIT 7 | BIT 6 | BIT 5 | BIT 4 | BIT 3 | BIT 2 | BIT 1 |
|---|---|---|---|---|---|---|---|
| 0 | 1 | 1 | 1 | 1 | 1 | 0 | 0 |

F I G. 14

IMAGE FORMING SYSTEM COMPRISING AN IMAGE FORMING DEVICE AND VARIOUS OPTIONAL DEVICES CONNECTED TO THE IMAGE FORMING DEVICE

BACKGROUND OF THE INVENTION

1. Field of the Invention

This invention relates to an image forming apparatus comprising an image forming device, such as a laser printer for receiving image data from an external device and forming images on paper sheets in accordance with the image data, and various optional units connected to the image forming device.

2. Description of the Related Art

An image forming apparatus, such as a laser printer, which receives image data from an external device and forms image on paper sheets in accordance withe image data has already been put to practical use.

In most cases, optional devices, such as a paper feeder, a paper discharging device, a paper-reversing device and an auxiliary paper feeder, are connected to the laser printer, constituting an image forming system. Whether or not any of these optional devices is connected to the laser printer, the paper-reversing device and the auxiliary paper feeder are required to print an image on the reverse side of a paper sheet. Whether any optional device is connected to the laser printer is determined in accordance with whether or not data is transferred between the printer and the optional device. Hence, once the optional device is turned off, it is no longer possible for a user to see whether the optional device is connected or not connected to the laser. This is a problem inherent in the conventional image forming system.

SUMMARY OF THE INVENTION

The object of the invention is to provide an image forming system which comprises an image forming device and a plurality of optional devices connected to the image forming device and in which it is possible to determine whether or not any optional device is correctly connected to the image forming device.

According to an aspect of this invention, there is provided an image forming system comprising an image forming device having image-forming means for forming an image on a transfer material, and first optional device connected to the image forming device for feeding the transfer material to the image forming device, and second optional device connect to the first optional device for discharging the transfer material from the image forming device, the image forming device comprising a first output means for outputting status-requesting commands to each of the optional devices, the request commands requesting data which represents the statuses the first and second optional devices and whether or not other optional devices are incorporated in the image forming system.

first data-receiving means for receiving first data and second data from each optional device in response to each status-requesting command supplied from the first input means, the first data representing whether the optional device is normal and the second data representing whether any other optional device is mounted.

means for detecting that first optional device is normally connected to the image forming device when the first data from a first optional device and the second data from the second optional device is received by the first data-receiving means.

Each of the first optional device and second optional device comprising:

second data receiving means for receiving the status-requesting commands output by the first output means;

second detector means for detecting whether any other optional device is mounted; and second output means for outputting the first data and the second data in response to the status-requesting command received by the second data-receiving means.

According to another aspect of this invention, there is provided device having image-forming means for forming an image on a transfer material, and first optional device connected to the image forming device, for feeding the transfer material to the image forming device, and second optional device connect to the first optional device for discharging the transfer material from, the image forming device, the image forming device comprising:

first output means for outputting status-requesting commands to each of the optional devices, the request commands requesting data which represents what statuses of the first and second optional devices have and whether or not other optional devices are incorporated in the image forming system;

first data-receiving means for receiving first data and second data from each optional device in response to each status-requesting command supplied from the first input means, the first data representing whether the optional device is normal and the second data representing whether any other optional device is mounted;

first detector means for detecting that a first optional device is normally connected to the image forming device when the first data from first optional device and the second data from second optional device received by the first data-receiving means;

memory means storing first data items showing conditions in which the optional devices are able to operate and second data items showing conditions in which the optional devices are correctly connected to the image forming device; and second detector means for detecting whether or not the devices are able to operate, in accordance with result of the detection performed by the first detector means and also the first data items and second data items stored in the memory means, and each of the optional device comprising:

second data receiving means for receiving the status-requesting commands output by the first output means;

third detector means for detecting whether any other optional device is mounted; and second output means for outputting the first data and the second data in response to the status-requesting command received by the second data-receiving means.

According to another aspect of this invention, there is provided an image forming system comprising:

a first device for forming an image on a paper sheet, the first device comprising a first sheet-discharging section and a second sheet-discharging section, each designed to discharge the paper sheet after the image has been formed on the paper sheet;

a second device located adjacent to the first device, for handling the paper sheet before the first device forms an image on the paper sheet;

a third device located adjacent the second device and remote from the first device, for handling the paper sheet before the first device forms an image on the paper sheet;

sheet-supplying means incorporated in the first device, for supplying the paper sheet discharged by the first sheet-discharging section to the third device;

first detector means incorporated in a device located adjacent to the second device, for detecting that the second device is placed between the first device and the third device; and second detector means incorporated in the second device, for detecting whether or not the second device is normally operating.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a block diagram showing an image forming system of an embodiment of the invention, which comprising a laser printer and optional devices;

FIG. 5 is a block diagram showing the major components of the laser printer of the system shown in FIG. 1;

FIG. 8 is a block diagram showing the major components of the paper feeding section shown in FIG. 1;

FIG. 9 is a block diagram showing the major components of the large-capacity feeder shown in FIG. 1;

FIG. 10 is a block diagram showing the main components of the large-capacity stacker shown in FIG. 1;

FIG. 12 is a diagram illustrating the sequence of commands and statuses, explaining how the laser printer operates while the power-supply switch of the system remains on;

FIG. 13 is a table indicating which optional device can operate under specific conditions; and FIG. 14 is a diagram showing the data supplied from the laser printer to each of the optional devices and showing the condition in which the optional device is connected to the laser printer.

DETAILED DESCRIPTION OF THE PREFERRED EMBODIMENT

Figure 2:
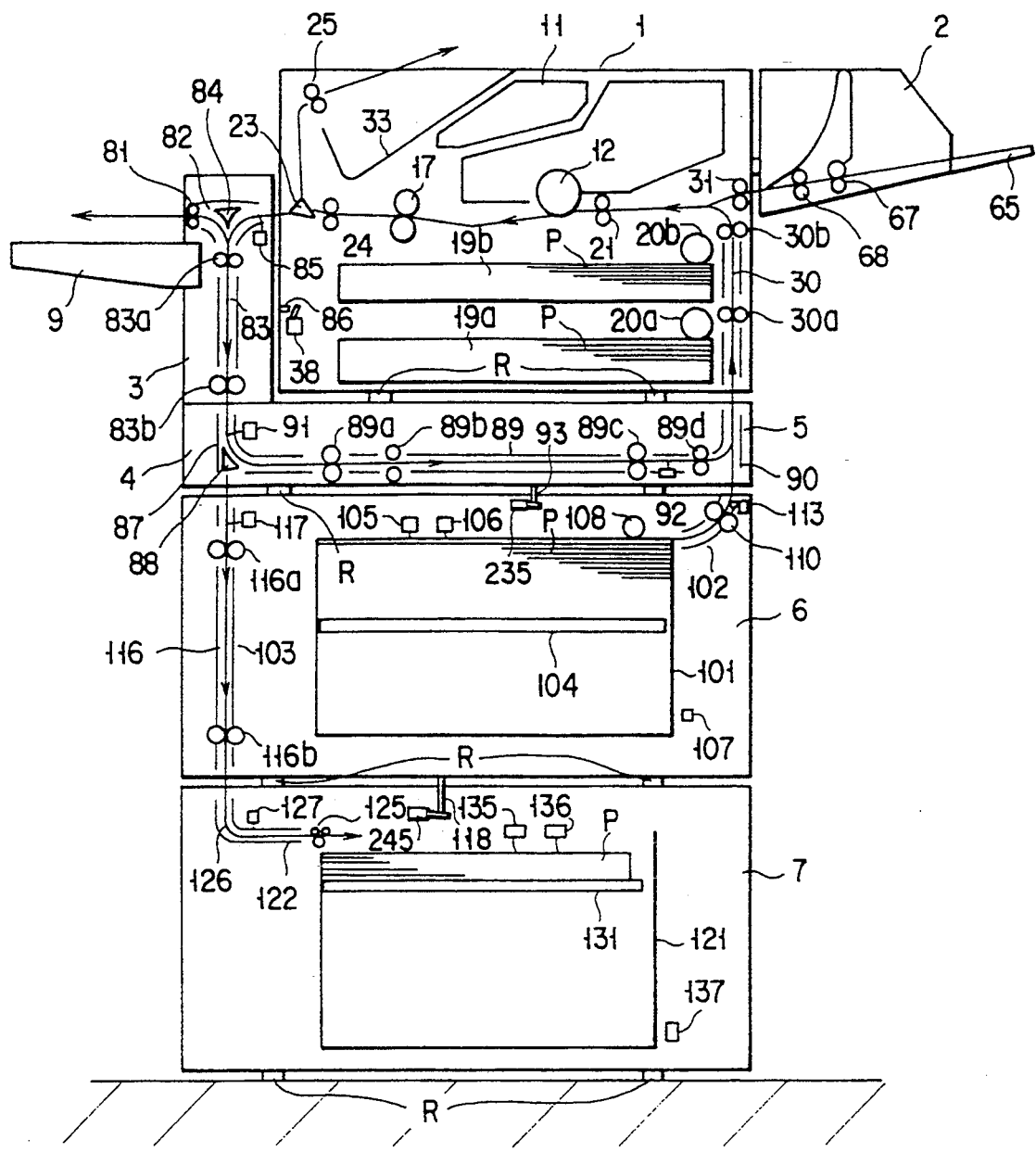
FIGS. 2 and 3 are cross-sectional views, showing the internal structure of the image forming system.

An embodiment of the present invention will now be described, with reference to the accompanying drawings.

FIG. 1 is a block diagram showing a image forming system according to the invention. The system comprises a laser printer 1 and several optional devices. The laser printer 1 is an image forming device designed to receive data from a host computer 10 (i.e., an external device) and to print on a sheet of paper an image represented by the data.

The optional devices are: a multi paper feeder (MPF) 2, an automatic document duplexer (ADD) 5, a large-capacity feeder (LCF) 6, and a large-capacity stacker (LCS) 7. The large-capacity stacker 7 can be replaced by a mail box stacker (MBS) 8. The optional devices are connected to the laser printer 1, some directly thereto, and the others indirectly thereto. The automatic document duplexer 5 comprises a paper-reversing section 3 and a paper feeding section 4.

The laser printer 1 comprises an operation panel 41, a printer control section 42, an engine control section, and various sensors and drivers (not shown).

The operation panel 41 is mounted on the top of the housing of the laser printer 1. It various operation instructions to the printer control section 42. The printer control section 42 receives image data from the host computer 10, converts the data into digital image data and controls the engine control section 43. The engine control section 43 controls the various electric components incorporated in the laser printer 1, so that these components provide an electrophotographic process, thereby printing on a paper sheet the image represented by the digital image data supplied from the printer control section 42.

The optional devices 2, 3, 4, 6, and 7 (or 8) each comprise a control circuit, sensors and drivers. More specifically, the paper feeder (MPF) 2 comprises a control circuit 191, sensors and drivers (not shown); the paper-reversing section 3 comprises a control circuit 201, sensors and drivers (not shown); the paper feeding section 4 comprises a control circuit 211 sensors and drivers (not shown); the large-capacity feeder 6 comprises a control circuit 231, sensors and drivers (not shown); and the large-capacity stacker (LCS) 7 comprises a control circuit 241, sensors and drivers (not shown). These optional devices are assigned ID numbers. The ID numbers are stored in a memory (not shown) incorporated in the laser printer 1.

As is shown in FIG. 2, the paper feeder 2 is connected to the right side of the laser printer 1. The paper-reversing section 3 of the automatic document duplexer 5 is connected to the left side of the laser printer 1. The paper-feeding section 4 of the automatic document duplexer 5 is connected to the bottom of the laser printer 1. The large-capacity feeder 6 is connected to the bottom of the paper-feeding section 4. The large-capacity stacker 7 is connected to the bottom of the large-capacity feeder 6. Each of the components 1, 2, 3, 4, 6 and 7 has two parallel rails on the bottom. Due to these rails, each component is correctly positioned when mounted on the immediately lower component.

A paper tray 9 is connected to the paper-reversing section 3, for receiving the paper sheets fed from the laser printer 1 and also the paper sheets fed from the automatic document duplexer 5.

Figure 3:
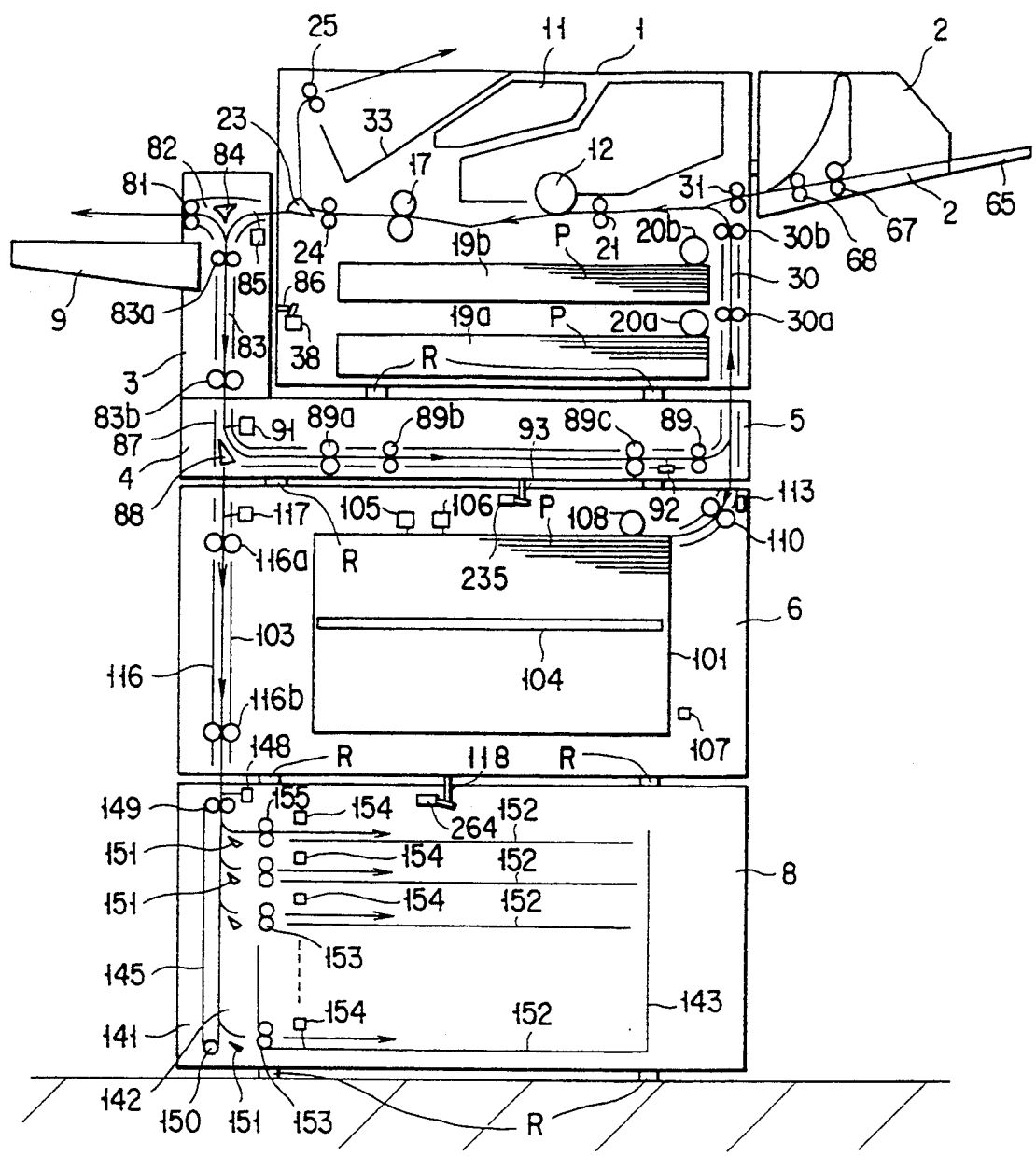

As is shown in FIG. 3, the large-capacity stacker 7 can be replaced by the mail box stacker 8.

The paper-reversing section 3 is mounted on the top of the paper-feeding section 4, which can be mounted on the top of the large-capacity feeder 6, the large-capacity stacker 7, or the mail box stacker 8, and be aligned therewith. Hence, the large-capacity feeder 6, the large-capacity stacker 7, and the mail box stacker 8 can operate independently of each other, in combination with the laser printer 1 and the automatic document duplexer 5.

With reference to FIG. 2, the laser printer 1 will now be described in detail.

Arranged within the housing of the printer 1 are: a laser optical system 11, a photosensitive drum 12, an electric charger (not shown), a developing device (not shown), an image transfer device (not shown), a pre-exposure device (not shown), a fixing device 17, a cleaning device (not shown)—all constituting a paper-processing system. The electric charger is a Scolotron, and the image transfer device is a Colotron. Also arranged within the housing are: paper cassettes 19a and 19b, paper-feeding rollers 20a and 20b, a pair of aligning rollers 21, a paper guide (not shown), a gate 23, a pair of paper-discharging rollers 24, and another pair of paper-discharging rollers 25.

The laser optical system 11 comprises a semiconductor laser (not shown), a collimator lens (not shown), a polygonal mirror (not shown), a f$\theta$ lens (not shown), a mirror (not shown), and a mirror motor 29. The laser emits a laser beam, and the collimator lens converts the laser beam to a parallel laser beam. The polygonal mirror is a rotary member and has an octahedral mirror section for reflecting the laser beam supplied from the lens, thereby applying the beam along a scanning line. The mirror motor 29 rotates the polygonal mirror.

The laser printer 1 forms an image in the following way. Image data is supplied to the laser optical system 11 supplied from the host computer 10 (i.e., an external device), and various operation instructions are input to the printer control section 42 from the operation panel 41. In accordance with the operation instructions, the control section 42 drives the laser optical system 11. The laser optical system 11 applies a laser beam onto the photosensitive drum 12, in accordance with the image data supplied from the host computer 10. Meanwhile, the photosensitive drum 12 is rotated, and the electric charger electrically charges the surface of the drum 12. As a result, an latent image represented by the image data is formed on the surface of the photosensitive drum 12.

More specifically, the semiconductor laser emits a beam to the polygonal mirror. The mirror motor 29 rotates the polygonal mirror. The polygonal mirror thereby reflects the laser beam, repeatedly scans at a constant speed the surface of the drum 12 with the beam, from the left end of the drum 12 to the right end thereof. As a result, an electrostatic latent image corresponding to the image data is formed on the surface of the photosensitive drum 12. The electrostatic latent image is converted into a visible one, i.e., a toner image, as the developing device applies toner onto the surface of the photosensitive drum 12.

In the meantime, paper sheets P are fed, one by one, from the paper cassette 19a or 19b by means of the paper-feeding roller 20a or 20b. Each paper sheet P is guided to the aligning rollers 21 along a passage 30 as it fed forward by a pair of rollers 30a and another pair of rollers 30b. The aligning rollers 21, which are rotated by known means, feed the sheet P to the image transfer device located right below the photosensitive drum 12.

A paper sheet P can be fed to the image transfer device by a pair of paper-feeding rollers 31 from the paper feeder 2 (i.e., one of the optional devices) which is connected to the right side of the laser printer 1.

Also, a paper sheet P can be supplied to the image transfer device from the other optional devices, i.e., the automatic document duplexer 5, the large-capacity feeder 6, the large-capacity stacker 7, and the mail box stacker 8. Whenever necessary, a paper sheet P is fed from any of these optional devices to the aligning rollers 21 along the passage 30, and the aligning rollers 21 feed the sheet P to the image transfer device.

Any paper sheet P fed to the image transfer device is brought into contact with the surface of the photosensitive drum 12. The toner image is thereby transferred from the drum 12 onto the paper sheet P. The sheet P, now bearing the toner image, is moved from the photosensitive drum 12 and supplied to the fixing device 17 along a paper guide. The fixing device 17 has a heat roller 17a and a roller paired with the heat roller 17a. As the paper sheet P passes through the nip between the heat roller 17a and said roller, the toner particles defining the toner image melts due to the heat the roller 17a, which contains a heater lamp (not shown), generates. As a result, the image is fixed on the paper sheet P.

The paper sheet P, now having the image fixed on it, is discharged onto a paper tray 9 through a gate 23 by means of the paper-discharging rollers 24, or into an upper passage 32 through the gate 23 to the paper-discharging rollers 25, which discharge the sheet P onto a paper tray 33.

After the toner image has been transferred from the drum 12 onto the paper sheet P, the cleaning device removes the residual toner from the photosensitive drum 12. Thereafter, the pre-exposure device erases the residual image from the photosensitive drum 12, so that another image may be formed on the surface of the drum 12.

The photosensitive drum 12, the electric charger, the developing device, the pre-exposure device, the fixing device 17, and the cleaning device are combined together, forming an electrophotographic process unit which is removably placed within the housing of the laser printer 1.

As is shown in FIG. 3, a switch 34 is located in front of the aligning rollers 21, for detecting the erroneous supply of a paper sheet P to the developing device. A switch 35 is provided in front of the paper-discharging rollers 24, for detecting the erroneous discharging of a paper sheet P. Further, a paper-feeding detector 36 is arranged in front of the paper-feeding rollers 31, for detecting the passage of a paper sheet P which has been supplied by hand or by paper feeder 2. A switch 37 is located above the paper-feeding detector 36, for detecting the connection of the paper feeder 2 to the laser printer 1. Also, a switch 38 is secured on the left side of the paper cassettes 19a and 19b, for detecting the connection of the paper-reversing section 3 to the laser printer 1.

An engine control board and a printer control board are arranged between the paper cassettes 19a and 19b. Mounted on the engine control board is an engine control section 43 designed to control the electrical components contained in the printer 1, thereby to accomplish an electrophotographic process. Mounted on the printer control board is a printer control section 42 designed to control the engine control section 43.

Figure 4:
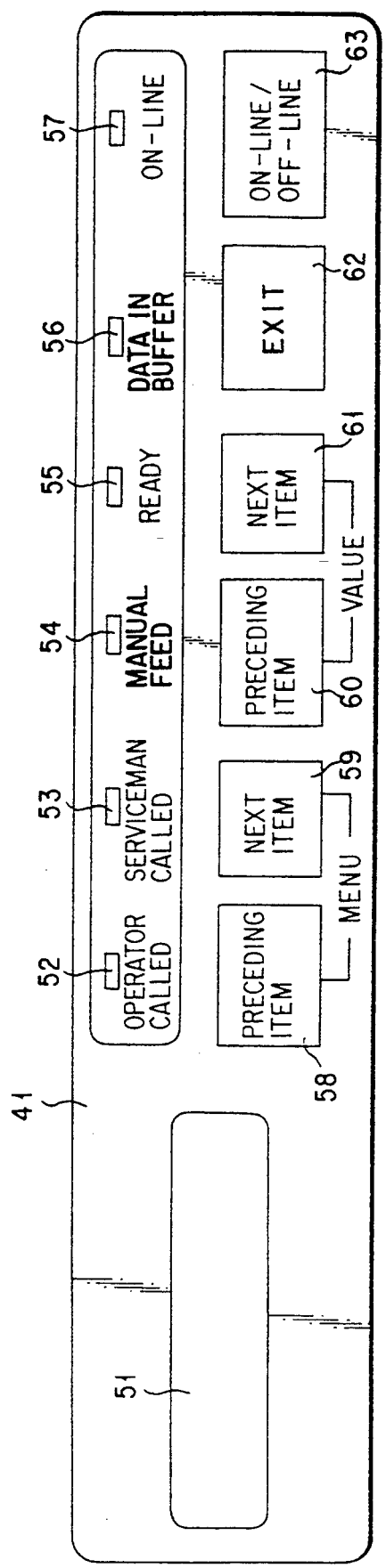
FIG. 4 is a plan view of the operation panel of the system shown in FIG. 1.

The operation panel 41 is mounted on top of the laser printer 1. As is shown in FIG. 4, the panel 1 has a liquid-crystal display 51, LED displays 52 to 57, a preceding menu-item key 58, a next menu-item key 59, a preceding value key 60, a next value key 61, a forced discharge key 62, and an on-line key 63.

The liquid-crystal display 51 is designed to display the number of copies to make, the mode in which to operate the printer 1, various instructions messages, and the like.

The LED displays 52–57 each have an LED (light-emitting diode), which is turned on to indicate a specific condition in which the printer 1 is operating. More specifically, the LED of the display 52 is turned on to call for an operator; the LED of the display 53 is turned on to call for a serviceman; the LED of the display 54 is turned on to ask an operator to feed paper sheets by hand; the LED of the display 55 is turned on to indicate that the printer 1 is ready to work; the LED of the display 56 is turned on when image data is being supplied to the printer 1; and the LED of the display 57 is turned on to indicate that the printer 1 is in the on-line mode, or is connected to the host computer 10. The on-line key 63 is operated to set the laser printer 1 in the on-line mode or off-line mode.

The liquid-crystal display 51 displays various menu items on its left half portion. The menu items are incremented every time the next menu-item key 59 is pushed, and are decremented every time the preceding menu-item key 58 is pushed. Hence, any menu item can be displayed cyclically on the display 51 by depressing the key 58 or 59.

The liquid-crystal display 51 displays on its right half portion the values for the menu items displayed on the left half portion. These values are incremented every time the next value key 61 is pushed, and are decremented every time the preceding value key 60 is pushed. Thus, the value for any menu item can be cyclically displayed on the display 51 by depressing the key 60 or 61.

One of the menu items is the designated paper source, i.e., the paper cassette 19a, the paper cassette 19b, the paper feeder 2, or the large-capacity feeder 6. Another of the menu items is the designated paper destination, i.e., the paper tray 9, the paper tray 33, the large-capacity stacker 7, or the mail box stacker 8.

Therefore, the operator can select any operation he or she wants the laser printer 1 to perform, by pushing the preceding menu-item key 58, the next menu-item key 59, the preceding value key 60, and the next value key 61—all provided on the operation panel 41.

With reference to FIG. 3, the paper feeder 2 will be described.

The paper feeder 2 comprises a paper tray 65, a pickup roller (not shown), a separating roller unit 67, and a pair of aligning rollers 68. The pickup roller rotates, feeding the paper sheets P placed on the tray 65, one after another, to the separating roller unit 67.

The separating roller unit 67 comprises an upper roller and a lower roller. A torque limiter (not shown) exerts a predetermined load on the upper roller. The lower roller extends parallel to and in contact with the upper roller, and drives the upper roller. The rollers of the unit 67 cooperate to separate paper sheets P, one by one, from the other sheets P supplied by the pickup roller, and to each feed this sheet P to the aligning rollers 68. The rollers 68 first align the paper sheet P and then supply it into the laser printer 1. The sheet P is fed further into the printer 1 by means of the paper-feeding rollers 31 located within the housing of the laser printer 1.

With reference to FIG. 2, the automatic document duplexer 5, which comprises the paper-reversing section 3 and the paper-feeding section 4, will now be described in detail.

The paper-reversing section 3 comprises a pair of paper-discharging rollers 81, a first paper passage 82, a second paper passage 83, and a sorting gate 84.

The first paper passage 82 guides a paper sheet P to the rollers 81 from the gate 23 of the laser printer 1. The second paper passage 83 guides a paper sheet P downward to the paper-feeding section 4, the sheet P having been discharged through the gate 23 or supplied by the paper-discharging rollers 81 rotating in the reverse direction. The sorting gate 84 guides a paper sheet P into either the first passage 82 or the second passage 83.

In operation, the paper sheet P discharged through the gate 23 of the laser printer 1 is guided through the first passage 82 to the gate 84. The gate 84 guides the sheet P to the paper-discharging rollers 81 or into the second paper passage 83. The sheet P guided to the rollers 81 is discharged onto the paper tray 9 by the paper-discharging rollers 81 rotating in the forward direction, or is guided toward the tray 9 for a distance equal to its length by the rollers 81 rotating in the forward direction and then back to the gate 84 by the rollers 81 rotating in the reverse direction. The paper sheet P, thus supplied to the gate 84, is guided into the second passage 83 and fed downward into the paper-feeding section 4.

A sensor 85 is located at the entrance to the first paper passage 82, for detecting the supply of a paper sheet P from the laser printer 1 into the first paper passage 82 of the paper-reversing section 3.

The second paper passage 83 is constituted by a pair of paper-feeding rollers 83a and another pair of paper-feeding rollers 83b.

A projection 79 protrudes from the right side of the paper-reversing section 3. When the section 3 is connected to the laser printer 1, the projection 79 pushes the switch 38 secured within the printer 1. As a result, the switch 38 detects that the section 3 has just been connected to the laser printer 1.

As is shown in FIG. 2, the paper-feeding section 4 comprises three paper passages 87, 89 and 90, and one sorting gate 88. The first paper passage 87 guides a paper sheet P downwards from the paper-reversing section 3 into the large-capacity feeder 6. The second paper passage 89 branches from the first passage 87, for guiding a paper sheet P horizontally to the third paper passage 90. The third paper passage 90 is connected to the second passage 89, for guiding upwards a paper sheet P from the second passage 89 or from the large-capacity feeder 6 into the laser printer 1. The sorting gate 88 guides a sheet P supplied from the paper-reversing section 3 into the large-capacity feeder 6 through the first passage 87 or into the second passage 79.

In operation, the paper sheet P fed from the paper-reversing section 3 is guided through the first passage 87 to the sorting gate 88. The gate 88 guides the sheet P into either the large-capacity feeder 6 or the second paper passage 89. The sheet P guided into the second paper passage 89 is fed into the first paper passage 30 of the laser printer 1. The sheet P supplied from the large-capacity feeder 6 is fed into the first paper passage 30 of the printer 1 through the third paper passage 90 of the paper-feeding section 4.

A sensor 91 is located in the vicinity of the entrance to the first paper passage 87 of the paper-feeding section 4. The sensor 91 detects the paper sheet P being supplied from the paper-reversing section 3 and passing through the first passage 87 of the paper-feeding section 4.

The second paper passage 89 comprises three pairs of paper-feeding rollers, 89a, 89b and 89c, and one pair of aligning rollers 89d. A sensor 92 is located between the pair of paper-feeding rollers 89c and the pair of aligning rollers 89c. The sensor 92 detects the sheet P which is being fed through the second paper passage 89.

A projection 93 protrudes downwards from the bottom of the paper-feeding section 4. An upper device sensor 235, which is also a switch, is arranged on the top surface of the large-capacity feeder 6. When the paper-feeding section 4 is placed on the large-capacity feeder 6, the projection 93 turns on sensor 235, which detects that the section 4 has just been mounted on the feeder 6.

The large-capacity feeder 6 will now be described, with reference to FIG. 2.

As is shown in FIG. 2, the large-capacity feeder 6 comprises a storage section 101 for storing paper sheets P, a paper-feeding section 102 for feeding sheets P from the storage section 101, and a paper-feeding mechanism 103.

The storage section 101 has a platform 104 for holding a stack of paper sheets P and a lift mechanism (not shown) urging the platform 104 to move upwards. The storage section 101 is a rectangular box open at the top. Claws (not shown) are slidably mounted on the inner surface of the right-side wall of the storage section 101. The elevator mechanism always urges the platform 104 upwards. Hence, the claws contact the uppermost sheet P of the stack placed on the platform 104, preventing the stack protruding up from the rim of the storage section 101.

The large-capacity feeder 6 further comprises a paper-empty switch 105, a first elevator switch 106, and a second elevator switch 107. The paper-empty switch 105 is located above the storage section 101, for detecting whether or not the section 101 is empty. The first elevator switch 106 is also arranged above the storage section 105, for detecting a predetermined number of sheets P have been fed out of the storage section 101. The second elevator switch 107 is located outside the storage section 101 and at the bottom thereof, for detecting that the platform 104 is at its lowest possible position in the storage section 101.

When the predetermined number of sheets P have been fed from the storage section 101, the first elevator switch 106 is turned on, driving an electric motor (not shown) in the forward direction for a predetermined period of time. This motor drives the elevator mechanism, which in turn lifts the platform 104. When the last paper sheet P is fed from the storage section 101, the paper-empty switch 105 is turned on, driving the electric motor in the reverse direction. As a result, the elevator mechanism lowers the platform 104. The moment the platform reaches its lowest position, the second elevator switch 107 is turned on, stopping the motor, whereby the platform 104 stops at its lowest position in the storage section 101.

Figure 11:
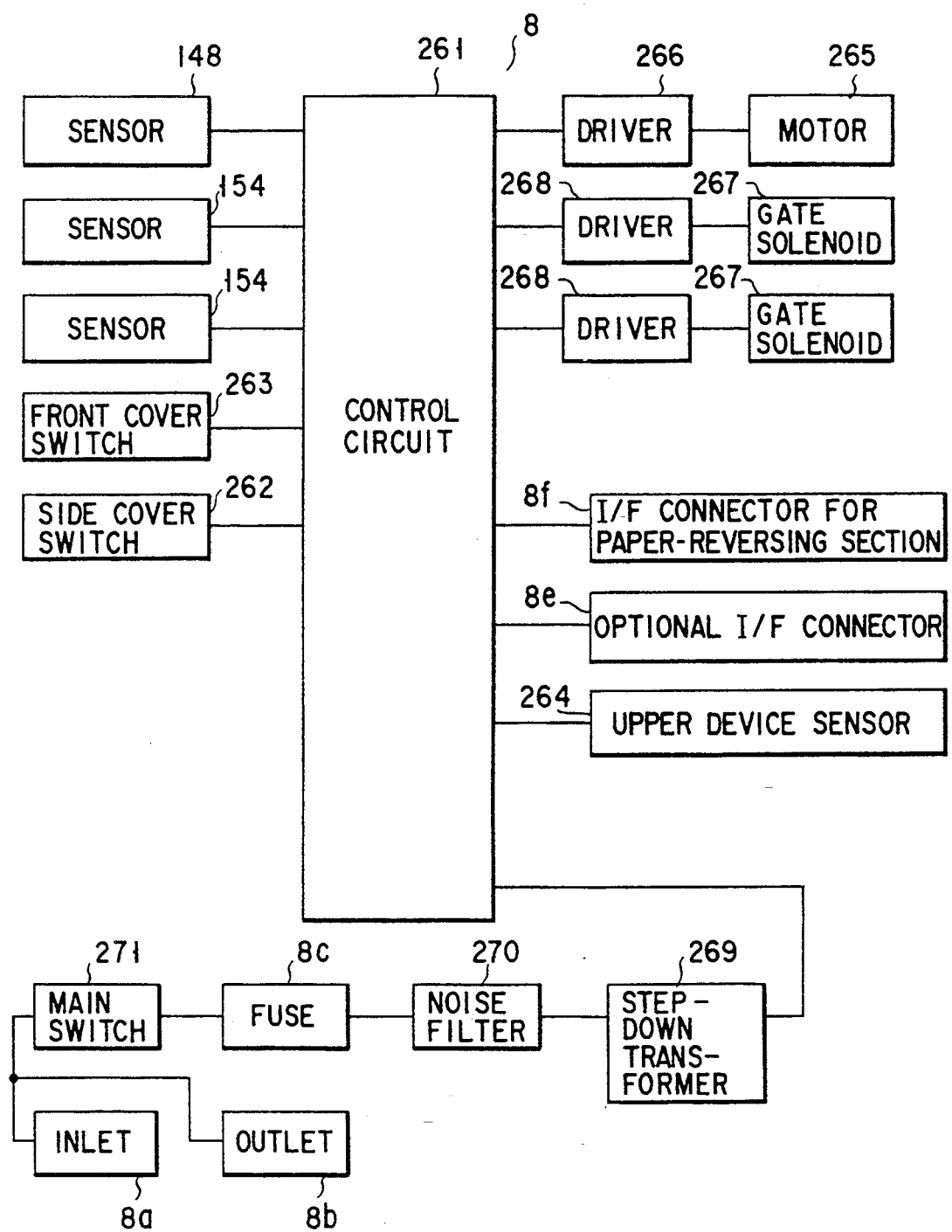
FIG. 11 is a block diagram showing the major components of the mail box stacker shown in FIG. 1.

As is shown in FIG. 11, the paper-feeding section 102 of the large-capacity feeder 6 comprises a paper-feeding roller 108, two paper guides 109, a pair of aligning rollers 110, two paper guides (not shown), a pre-feeding sensor 113, and a pulse motor 238 (later described). A pulley (not shown) is coaxially connected to the paper-feeding roller 108, and a pulley (not shown) is secured to the shaft of the pulse motor 238. An endless belt (not shown) is wrapped around these pulleys. The paper guides 109, the aligning rollers 110, and the paper guides 111 constitute a paper passage 112 which extends from the right rim of the storage section 101 to the third paper passage 90 of the paper-feeding section 4. When driven by the motor (not shown), the paper-feeding roller 108 feeds the uppermost sheet P from the storage section 101 into the paper passage 112. The sheet P is supplied through the passage 112 as the aligning rollers 110 are rotated. The sensor 113 detects the paper sheet P as the sheet P moves into the third paper passage 90 of the paper-feeding section 4.

As is evident from FIG. 2, the paper-feeding mechanism 103 comprises a paper passage 116 constituted by two pairs of paper-feeding rollers, 116a and 116b, and a sensor 117 located near the pair of paper-feeding rollers 116a. The paper passage 116 extends vertically, and the mechanism 103 feeds paper sheets P downwards from the first passage 87 of the paper-feeding section 4 to either the large-capacity stacker 7 or the mail box stacker 8. The sensor 117 detects any sheet P supplied into the paper passage from the first passage 87 of the paper-feeding section 4.

The upper device sensor 235 is located above the first elevator switch 106. When pushed by the projection 93, the sensor 235 is turned on, generating an signal. From this signal, it can be determined that the paper-feeding section 4 is mounted on the large-capacity feeder 6, even if the power-supply switch of the section 4 is off.

A projection 118 protrudes downwards from the bottom of the paper-feeding section 4. The projection 118 is used to turn on an upper device sensor 245 provided in the large-capacity stacker 7 and an upper device sensor 264 located in the mail box stacker 8.

The large-capacity stacker 7 will be described in detail, with reference to FIG. 2.

As is shown in FIG. 2, the large-capacity stacker 7 comprises an elevator mechanism 131, a storage section 121, a paper-feeding section 122, and a sensor 118. The mechanism 131 and the section 122 cooperate to stack paper sheets P in the storage section 121.

In the paper-feeding section 122, a paper sheet P supplied from the paper passage 116 of the large-capacity feeder 6 is fed into the storage section 121 through a paper passage 126 constituted by paper guides (not shown) and three paper-discharging rollers 125. The sensor 127, located near the guides, detects the sheet P which is passing through the paper passage 126.

The storage section 121 has a platform 131 for supporting paper sheets P discharged out of the paper passage 126. The platform 131 can be moved up and down by the elevator mechanism 120.

A paper-empty switch 135 is located above the storage section 121, for detecting whether or not the section 121 is empty. A first elevator switch 136 is arranged also above the storage section 121, for detecting a predetermined number of sheets P can be placed on the platform 131. A second elevator switch 137 is located outside the storage section 121 and at the bottom thereof, for detecting that the platform 131 is at its lowest possible position in the storage section 121. In other words, the second elevator switch 137 is used to detect that the storage section 121 is full of paper sheets P.

When the predetermined number of paper sheets P are placed on the platform 131, the first elevator switch 136 is turned on. Then, the motor is driven for a predetermined time or until the first elevator switch 136 is turned off, lowering the platform 131.

The upper device sensor 245 is located above the storage section 121. This sensor 245 is turned on by the projection 118 of the large-capacity feeder 6 when the feeder 6 is mounted on the large-capacity stacker 7. When so turned on, the sensor 245 generates a signal. From this signal, it can be determined that the paper-feeding section 6 is placed on the large-capacity stacker 7, even if the power-supply switch of the section 6 is off. Since the upper device sensor 245 is so positioned that it is not turned on by the projection 93 even if the paper-feeding section 4 is mounted on the large-capacity stacker 7.

The mail box stacker 8 will now be described, with reference to FIG. 3.

As is shown in FIG. 3, the mail box stacker 8 comprises a paper-feeding section 141, a paper-sorting section 142, and a storage section 134.

In the paper-feeding section 141, a paper sheet P supplied from the paper passage 116 of the large-capacity feeder 6 is fed through a paper passage 147. The paper passage 147 is constituted by guides (not shown), an endless belt 145, and a paper-feeding roller (not shown). A sensor 148 is arranged near the guides, for detecting the feeding of the paper P through the paper passage 147.

The endless belt 145 is wound around two rollers 149 and 150, one of which is rotated by an electric motor 265 (later described). As a result, the belt 145 is driven by this motor 265.

The paper-sorting section 142 has a plurality of gates 151 and pairs of paper-discharging rollers 153. The storage section 143 comprises a plurality of paper tray 152 and a plurality of sensors 154, each located above one paper tray 152. Each gate 151 and the pair of rollers 153 located at the exit of the gate 151 form a unit for discharging a paper sheet P onto the associated paper tray 152. Each sensor 154 detects each paper sheet P being placed onto the associated paper tray 152.

The upper device sensor 264 is secured above the storage section 143. The sensor 264 is turned on by the projection 118 of the large-capacity feeder 6 when the stacker 8 is mounted on the mail box stacker 8. When so turned on, the sensor 264 generates a signal. From this signal, it can be determined that the large-capacity feeder 6 is placed on the mail box stacker 8, even if the power-supply switch of the stacker 8 is off. Since the upper device sensor 264 is so positioned that it is not turned on by the projection 93 even if the paper-feeding section 4 is mounted on the mail box stacker 8.

As is shown in FIG. 1, the laser printer 1 and the optional devices are connected by connectors and cables. To be more specific, a cable 165 connects the optional I/F connector 1b of the laser printer 1 to the I/F connector 2a of the paper feeder 2 (FIG. 5); a cable 166 connects the optional I/F connector 1c of the laser printer 1 to the I/F connector 4d of the paper-feeding section 4; a cable 167 connects the optional I/F connector 4c of the paper-feeding section 4 to the I/F connector 6e of the large-capacity feeder 6; a cable 168 connects the optional I/F connector 6f of the large-capacity feeder 6 to the I/F connector 7e of the large-capacity stacker 7; and a cable 169 connects the optional I/F connector 4e of the paper-feeding section 4 to the I/F connector 3a of the paper-reversing section 3.

With reference to FIG. 5, the control circuit incorporated in the laser printer 1 will now be described.

As has been described, the housing of the laser printer 1 contains the engine control section 43, which controls the electrical components of the printer 1, to accomplish an electrophotographic process. Connected to the engine control section 43 are: the laser optical system 11, the pre-exposure device 191, the fixing device 17, the sensors 34, 35, 36, the switch 37 for detecting the connection of the feeder 2 to the printer 1, the switch 38 for detecting the connection of section 3 to the printer 1, the option I/F connectors 1b and 1c, a high voltage source 171, a mechanism drive circuit 172, and a power-supplying device 173.

The engine control section 43 has a memory 43a which stores a table for determining, as will be explained later, which optional devices are correctly connected to the laser printer 1.

The high-voltage source 171 supplies a development bias signal to a development-bias supplying section (not shown), a charging signal to the electric charger 13, and an image-transfer signal to the wire high-voltage supplying section (not shown) of the image transfer device, each signal being of a high voltage.

The mechanism drive circuit 172 is designed to drive motors and solenoids. Connected to this circuit 172 are: a cooling fan 177, a main motor 178, a manual paper-feeding solenoid 179, a cassette paper-feeding solenoid 180, an aligning solenoid 181, a toner-supplying solenoid 182, and a gate solenoid 183.

When the manual paper-feeding solenoid 179 is excited, the rotation of the main motor 178 is transmitted to the pair of paper-feeding rollers 31. When the cassette paper-feeding solenoid 180 is excited, the rotation of the main motor 178 is transmitted to either the paper-feeding roller 20a or the paper-feeding roller 20b.

When the aligning solenoid 181 is excited, the rotation of the main motor 178 is transmitted to the pair of aligning rollers 21. When the toner-supplying solenoid 182 is excited, the rotation of the main motor 178 is transmitted to the toner-supplying roller (not shown) incorporated in the developing device 14. When the gate solenoid 183 is excited, the gate 23 is turned on.

As is shown in FIG. 5, the laser optical system 11 comprises a scanner control circuit 174. The circuit 174 is connected to the semiconductor laser 175, a laser-beam sensor 176, and the mirror motor 29, for controlling components 29, 175, and 176.

As is shown in FIG. 5, the fixing device 17 has a heat roller 17a, a heater lamp 17b contained in the roller 17a, and a thermistor 17c located near the roller 17a to detect the temperature therearound.

The power-supplying device 173 comprises a stepping transformer 184, a noise filter 185 connected to the transformer 184, and fuse 186 connected to the filter 185. Thus, the stepping transformer 184 is connected to an inlet 1a by the noise filter 185, the fuse 186, and a main switch 187.

When the main switch 187 is turned on, the power-supplying device 173 outputs a power-supply voltage of +5 V and a power-supply voltage of +24 V. The voltage of +5 V is applied to the engine control section 43, and hence to the printer control section 42. The voltage of +24 V is applied to a cover switch 188, and hence to a cover switch 189, and finally to the engine control section 43. The voltage of +24 V is applied from the section 43 to the scanner control circuit 174, the high-voltage source 171, and the mechanism drive circuit 172.

The scanner control circuit 174 applies the voltage of +25 V to the semiconductor laser 175 and the mirror motor 29. The mechanism drive circuit 172 applies the voltage of +25 V to the pre-exposure device 191, the main motor 178, the manual paper-feeding solenoid 179, the cassette paper-feeding solenoid 180, the aligning solenoid 181, the toner-supplying solenoid 182, the gate solenoid 183, and the cooling fan 177, thereby driving these components 177, 178, 179, 180, 181, 183, 183, and 191.

The power-supplying device 173 further comprises a lamp drive circuit (not shown) for driving the heater lamp 17b of the fixing device 17. This lamp drive circuit is of zero-cross switching type. It comprises. for example, a triac and a phototriac coupler. The light-emitting diode of the phototriac coupler is driven with the voltage of +24 V. As is known in the art, when the light-emitting diode is on or off, the light-receiving phototriac is turned on or off at the zero-cross point of the AC power supply. As a result, this phototriac turns the next-stage triac on or off, whereby an AC current is supplied or not supplied to the heater lamp 17b.

The engine control section 43 supplies a heater control signal to the power-supplying device 173. The thermistor 17c generates a signal representing the temperature in the fixing device 17. This signal is supplied to the engine control section 43.

The cover switch 188 is turned off when the top cover (not shown) of the laser printer 1 is rotated upward to an opened position. The cover switch 189 is turned off when the rear cover (not shown) of the printer 1 is opened. Hence, when the top cover or the rear cover, or both are opened, the supply of the +24 voltage to the engine control section 43, whereby the laser 175, the motor 29, the power supply 171, the main motor 178, the solenoids 179 to 183, the fan 177, and heater lamp 17b can no longer operate. Hence, the operator can have an access into the laser printer 1, without any danger.

Figure 6:
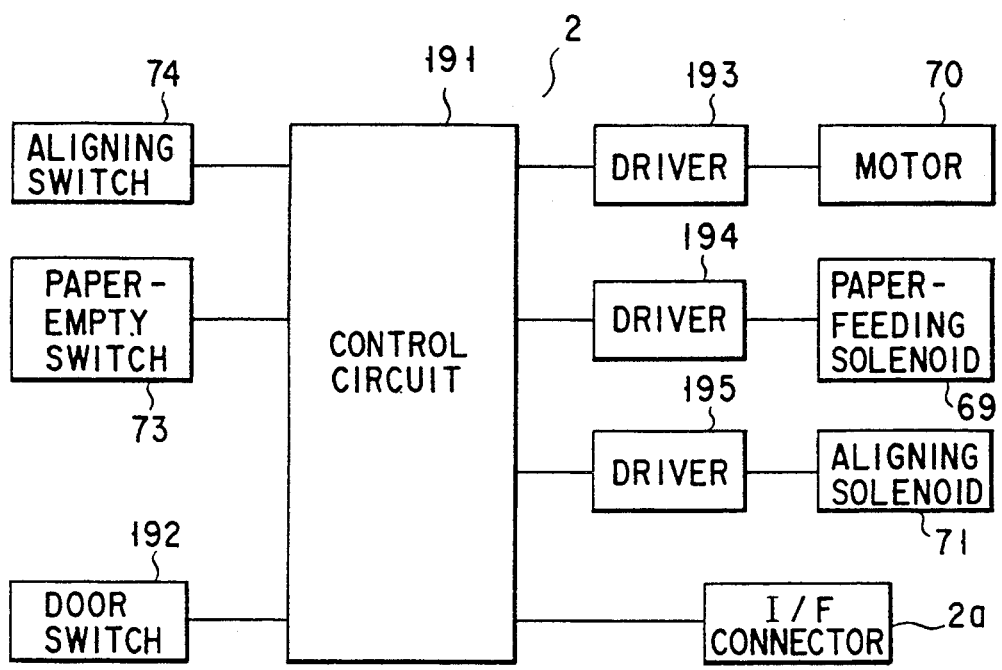
FIG. 6 is a block diagram showing the major components of the paper feeder shown in FIG. 1.

The control circuit 191 provided in the paper feeder 2 will be described, with reference to FIG. 6. Connected to the control circuit 191 are: a paper-empty switch 73, an aligning switch 74, an I/F connector 2a, a driver 193 for driving the motor 70, a driver 194 for driving the paper-feeding solenoid 69, and a driver 195 for driving the aligning solenoid 71.

Figure 7:
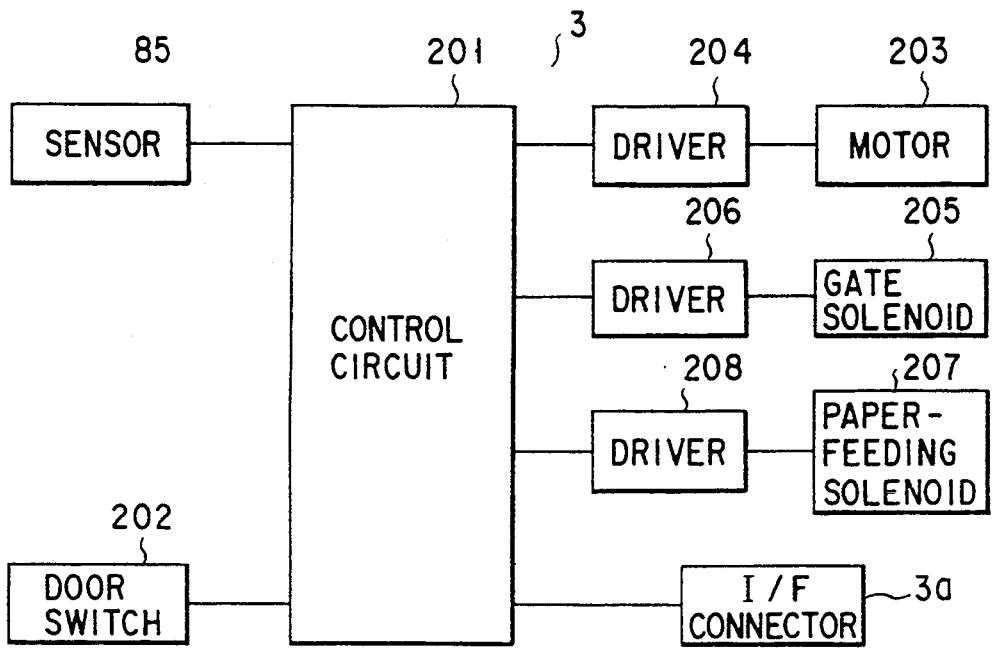
FIG. 7 is a block diagram showing the major components of the paper-reversing section shown in FIG. 1.

The control circuit 201 incorporated in the paper-reversing section 3 will be described, with reference to FIG. 7. Connected to the circuit 201 are: the sensor 85, an I/F connector 3a, a door switch 202, a driver 204 for driving a motor 203 a driver 206 for exciting a gate solenoid 205, and a driver 208 for exciting a paper-feeding solenoid 207. When the gate solenoid 205 is excited, the sorting gate 84 is switched. When the paper-feeding solenoid 207 is excited, the rotation of the motor 203 is transmitted to the paper-discharging rollers 81.

The control circuit 211 used in the paper-feeding section 4 will be described, with reference to FIG. 8. Connected to the control circuit 211 are: the sensors 91 and 92, an I/F connector 4e for the paper-reversing section 3, optional I/F connectors 4c and 4d, a door switch 212, a driver 214 for driving a motor 213, a driver 216 for exciting a gate solenoid 215, a driver 218 for exciting an aligning solenoid 217, and a step-down transformer 219. The step-down transformer 219 is connected to a noise filter 220, which is connected to a fuse 4b. The fuse 4b is connected to a main switch 221, and the switch 221 is connected to an inlet 4a.

The control circuit 231 used in the large-capacity feeder 6 will be described, with reference to FIG. 9. Connected to the control circuit 231 are: the sensor 117, the paper-empty switch 105, the first elevator switch 106, the second elevator switch 107, an I/F connector 6g for the paper-reversing section 3, optional I/F connectors 6e and 6f, a pre-feeding sensor 113, an elevator down switch 232, a side-cover switch 233, a front-cover switch 234, the upper device switch 235, a driver 237 for driving the elevator motor 236, a driver 241 for exciting a paper-feeding solenoid 280, a driver 283 for exciting an aligning solenoid 282, and a step-down transformer 244. The step-down transformer 284 is connected to a noise filter 285, which is connected to a fuse 6c. The fuse 6c is connected to a main switch 286. The main switch 286 is connected to an inlet 6a and an outlet 6b.

When turned on, the elevator down switch 232 lowers the platform 106 forcibly. The upper device switch 235 is turned on by the projection 93 when the paper-feeding section 4 is mounted on the large-capacity feeder 6. When the paper-feeding solenoid 280 is excited, the rotation of he pulse motor 238 is transmitted to the paper-feeding roller 108. When the aligning solenoid 282 is excited, the rotation of the pulse motor 238 is transmitted to the aligning rollers 110.

The control circuit 241 used in the large-capacity stacker 7 will be described, with reference to FIG. Connected to the control circuit 241 are: the sensor 127, the paper-empty switch 135, the first elevator switch 136, the second elevator switch 137, an I/F connector 7f for the paper-reversing section 3, an optional I/F connector 7e, an elevator down switch 242, a side-cover switch 139, a front-cover switch 244, the upper device switch 245, a jog sensor 246, a driver 248 for driving the elevator motor 247, a driver 250 for driving a pulse motor 249, a driver 252 for exciting an electromagnetic clutch 251 for a jogger, a driver 254 for exciting a jog solenoid 253, and a step-down trans-former 255.

when the elevator down switch 242 is turned on, the platform 131 is lowered forcibly. The upper device switch 245 is turned on by the projection 118 when the large-capacity paper feeder 6 is mounted on the large-capacity stacker 7. The jog sensor 246 is provided for detecting the condition of a jogger mechanism (not shown). The jogger mechanism is driven when both the electromagnetic clutch 251 and the jog solenoid 253 are excited.

The step-down transformer 255 is connected to a noise filter 256, which is connected to a fuse 7c. The fuse 7c is connected to a main switch 257. The main switch 257 is connected to an inlet 7a and an outlet 7b.

The control circuit 261 used in the mail box stacker 8 will be described, with reference to FIG. 11. Connected to the control circuit 261 are: the sensor 148, the sensors 154, an I/F connector 8f for the paper-reversing section 3, an optional I/F connector Be, a side-cover switch 262, a front-cover switch 263, the upper device switch 244, a driver 266 for driving the elevator motor 265, two drivers 268 for exciting two gate solenoids 267, respectively, and a step-down transformer 269. The step-down transformer 269 is connected to a noise filter 270, which is connected to a fuse 8c. The fuse 8c is connected to a main switch 271. The main switch 271 is connected to an inlet 8a and an outlet 8b.

The upper device switch 264 is turned on by the projection 118 when the large-capacity paper feeder 6 is mounted on the mail box stacker 8. When the gate solenoids 267 are excited, the sorting gates 151 are driven.

With reference to FIG. 12, which illustrates the sequence of commands and statuses, it will be explained how the laser printer 1 operates while the power-supply switch of the system remains on.

When the power-supply switch of the printer 1 is turned on, the engine control section 43 gives a reset command to the optional devices 4, 6, 7, and 8, thereby resetting the optional devices 4, 6, 7, and 8. At the same time, the data stored in the memory 43a of the section 43 is erased, said data showing which optional device is correctly connected to the laser printer 1.

Next, the engine control section 43 supplies status-requesting commands sequentially to the optional devices 4, 6, 7, and 8. More specifically, the section 43 supplies the first status-requesting command to the control circuit 211 of the paper-feeding section 4, and receives a basic status from the control circuit 211; the section 43 supplies the second status-requesting command to the control circuit 231 of the large-capacity feeder 6, and receives a basic status from the control circuit 231; the section 43 supplies the third status-requesting command to the control circuit 241 of the large-capacity stacker 7, and receives a basic status from the control circuit 241; and the section 43 supplies the fourth status-requesting command to the control circuit 261 of the mail box stacker 8, and receives a basic status from the control circuit 261.

The basic status sent to the engine control section 43 from the control circuit 231 of the large-capacity feeder 6 includes the output of the upper device sensor 235, which shows that the paper-feeding section 4 is mounted on the large-capacity feeder 6.

The basic status sent to the engine control section 43 from the control circuit 241 of the large-capacity stacker 7 includes the output of the upper device sensor 245, which shows that the large-capacity feeder 6 is mounted on the large-capacity stacker 7.

The basic status sent to the engine control section 43 from the control circuit 261 of the mail box stacker 8 includes the output of the upper device sensor 264, which shows that the large-capacity feeder 6 is mounted on the mail box stacker 8.

Then, the engine control section 43 supplies ID-requesting commands sequentially to the control circuits 211, 231, 241, and 261 of the optional devices 4, 6, 7, and 8, respectively. In response to the ID-requesting command, each optional device reads the ID number assigned to it and stored in its memory. The ID numbers of the devices 4, 6, 7 and 8 are sent to the engine control section 43. The section 43 determines whether or not the optional devices are connected to the laser printer 1, from the statuses and ID-numbers sent from the control circuits 211, 231, 241 and 261, and the condition of the switch 38 used in the paper-reversing section 3.

Further, the engine control section 43 determines whether or not optional devices 2, 3, 6, 7 and 8 can be operated, based on the table stored in the memory 43a and the data showing which optional devices is connected to the printer 1. The table stored in the memory 43a is schematically shown in FIG. 13, wherein the mark "*" indicates that the optional device in question is connected to the laser printer 1.

As may be understood from FIG. 13, if only the paper-reversing section 3, only the paper-feeding section 4, only the large-capacity stacker 7, or only the mail box stacker 8 is connected to the printer 1, or if the section 4 and the stacker 8 are connected to the printer 1, the section 43 determines that none of the optional devices can operate.

If only the large-capacity feeder 6 is connected to the printer 1, the control section 43 determines that the feeder 6 can operate.

If the paper-feeding section 4 and the large-capacity feeder 6 are connected to the printer 1, if the feeder 6 and the large-capacity stacker 7 are to the printer 1, if the section 6 and the mail box stacker 8 are connected to the printer 1, or if the section 4, the feeder 6 and the stacker 8 are connected to the printer 1, the section 43 determines that only the large-capacity feeder 6 can operate.

If the large-capacity stacker 7 and the mail box stacker 8 are connected to the printer 1, if the paper-feeding section 4 and the stacker 7 are connected to the printer 1, if the large-capacity feeder 6 and both stackers 7 and 8 are connected to the printer 1, if the section 4, the feeder 6 and both stackers 7 and 8 are connected to the printer 1, if the paper-reversing section 3 and both stackers 7 and 8 are connected to the printer 1, if the section 3, the feeder 6 and both stackers 7 and 8 are connected to the printer 1, or if the section 3, the section 4, the feeder 6 and the stacker 7 are connected to the printer 1, the control section 43 determines that the optional devices cannot operate in any possible combination.

If the paper-reversing section 3 and the paper-feeding section 4 are connected to the printer, the section 43 determines that both sections 3 and 4 can operate. If the section 3 and the large-capacity feeder 6 are connected to the printer 1, the control section 43 determines that the section 3 and the feeder 6 can operate. If the section 3, the section 4, and the feeder 6 are connected to the printer 1, the section 43 determines that these optional devices 3, 4, and 6 can operate.

If the paper-reversing section 3 and the large-capacity stacker 7 are connected to the printer 1, the control section 43 determines that both optional devices 3 and 7 can operate. If the section 3, the large-capacity feeder 6, and the stacker 7 are connected to the printer 1, the section 43 determines that these three optional devices 3, 6, and 7 can operate. If the section 3, the paper-feeding section 4, and the stacker 7 are connected to the printer 1, the section 43 determines that these three optional devices 3, 4, and 7 can operate. If the section 3, the section 4, the feeder 6, and the stacker 7 are connected to the printer 1, the section 43 determines that these three optional devices 3, 4, 6, and 7 can operate.

Further, if the paper-reversing section 3 and the mail box stacker 8 are connected to the laser printer 1, the section 43 determines that these optional devices 3 and 8 can operate. If the paper-reversing section 3, the paper-feeding section 4, and the mail box stacker 8 are connected to the laser printer 1, the control section 43 determines that these optional devices 3, 4, and 8 can operate. If the paper-reversing section 3, the large-capacity feeder 6, and the stacker 8 are connected to the printer 1, the section 43 determines that these optional devices 3, 6, and 8 can operate. If the reversing section 3, the section 4, the feeder 6, and the stacker 8 are connected to the printer 1, the section 43 determines that these optional devices 3, 4, 6, and 8 can operate.

Whether or not the paper-feeding section 4 is connected to the laser printer 1 can be detected with high accuracy, even if the basic status is not supplied from the section 4 to the control section 43 due to, for example, no power supply to the paper-feeding section 4. This is because the upper device sensor 235 of large-capacity feeder 6 detects that the section 4 has been mounted on the large-capacity feeder 6.

Similarly, whether or not the large-capacity feeder 6 is connected to the laser printer 1 can be detected with high accuracy, even if the basic status is not supplied from the section 6 to the control section 43 due to, for example, no power supply to the feeder 6. This is because the upper device sensor 245 of the large-capacity stacker 7 or the upper device 264 of the mail box stacker 8 detects that the feeder 6 has been mounted on the large-capacity stacker 7 or the mail box stacker 8.

Thereafter, the engine control section 43 supplies a condition status-sending command to the optional deices 2, 3, 4, 6, 7, and 8, and then the data items thereto. Each of the data items shows the connection or disconnection of the optional device to the laser printer 1. In each optional device, the control circuit (191,201,211,231, 241, or 261) stores the data item into its memory.

As is shown in FIG. 14, the data item the section 43 supplies to each optional device is an 8-bit digital data. Of these eight bits, bits 3, 4, 5, 6 and 7 are assigned to the paper-feeding section 3, the large-capacity feeder 6, the large-capacity stacker 7, and the mail box stacker 8, and the paper-reversing section 3, respectively. When each bit is "0," it means that the optional device is not connected to the laser printer 1; when it is "1," it means that the optional device is connected to thereto.

The data showing distance for which to feed a paper sheet P, and the data showing period within which to feed a paper sheet P though a passage and upon lapse of which to detect jamming are stored in the memory of each of the optional devices 4, 6, 7, and 8. For instance, in the case where the paper-feeding section 4 is mounted on the large-capacity feeder 6, the memory incorporated in the feeder 6 stores the data representing such a distance that a paper sheet P is pre-fed up to the top of the paper-feeding section 4; in the case where the section 4 not is mounted on the feeder 6, the memory of the feeder 6 stores the data representing such a distance that a paper sheet P is pre-fed to the top of the large-capacity feeder 6.

As has been indicated, the liquid-crystal display 51 displays various menu items on its left half portion, and the menu items are incremented every time the next menu-item key 59 is pushed, and are decremented every time the preceding menu-item key 58 is pushed. In order to select a paper source or a paper destination, the display 51 display all paper sources and all paper destinations, one after another, except for those which are not connected to the laser printer 1 or those to which no power is supplied. More specifically, in the paper-source selection mode, the display 51 displays "UPPER CASSETTE," "LOWER CASSETTE," "MANUAL FEED," "MULTI PAPER FEEDER," "PAPER FEEDING SECTION," and "LARGE CAPACITY FEEDER," one after another in the order mentioned. If the feeder 2, for example, is not connected to the printer 1, or no power is supplied to the feeder 2, the display 51 does not display the words "PAPER FEEDER." On the other hand, in the paper-destination selection mode, the display 51 displays "UPPER PAPER TRAY," "SIDE PAPER TRAY," "PAPER FEEDING SECTION," "LARGE CAPACITY STACKER," and "MAIL BOX STACKER", one after another, in the order mentioned. If the large-capacity stacker 7, for example, is not connected to the printer 1, or no power is supplied to the stacker 7, the display 51 does not display the words "LARGE CAPACITY STACKER."

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image forming system comprising an image forming device having image-forming means for forming an image on a transfer material, a first optional device connected to said image forming device for feeding the transfer material to said image forming device, and a second optional device connected to said first optional device for discharging the transfer material from said image forming device, said image forming device comprising:

first output means for outputting status-requesting commands to each of said first and second optional devices, said request commands requesting data which represents the status of said first and second optional devices and whether other optional devices are incorporated in the image forming system;

first data-receiving means for receiving first data and second data from each optional device in response to each status-requesting command output by said first means, said first data representing whether said first and second optional devices are normal and said second data representing whether one of said first and second optional devices is mounted on the other of said first and second optional devices;

a first detector means for detecting if said first optional device is normally connected to said image forming device when the first data from said first optional device and the second data from said second optional device is received by said first data-receiving means;

each of said first optional device and said second optional device comprising:

second data receiving means for receiving the status-requesting commands output by said first output means;

second detector means for detecting whether one of said first and second optional devices is mounted on the other of said first and second optional devices; and second output means for outputting the first data and the second data in response to the status-requesting command received by said second data-receiving means.

2. The image forming system according to claim 1, wherein said second detector means is located at a specific position, and is turned on by a detecting member secured to one of said first and second optional devices, thereby to detect that the other of said first and second optional devices is mounted on
   said one of said first and second optional devices, regardless of whether the other of said first and second optional devices has been turned on.

3. The image forming system according to claim 1, in which said image forming device has a power-supply switch, and in which said first output means is actuated when said power-supply switch is turned on.

4. An image forming system comprising an image forming device having image-forming means for forming an image on a transfer material, and a first optional device connected to said image forming device for feeding the transfer material to said image forming device, and a second optional device connected to said first optional device for discharging the transfer material from said image forming device, comprising:
   first output means for outputting status-requesting commands to each of said first and second optional devices, said request commands requesting data which represents the statuses of said first and second optional devices and whether one of said first and second optional devices is mounted the other of said first and second optional devices;
   first data-receiving means for receiving first data and second data from each of said first and second optional devices in response to each status-requesting command output by said first output means, said first data representing whether said first and second optional devices are normal, and said second data representing whether one of said first and second optional devices is mounted on the other of said first and second optional devices;
   first detector means for detecting that said first optional device is normally connected to said image forming device when the first data output said first optional device and the second data output by said second optional device are received by said first data-receiving means;
   memory means for storing first data items showing conditions in which said first and second optional devices are able to operate and second data items showing conditions in which said first and second optional devices are correctly connected to said image forming device; and
   second detector means for detecting whether said first and second optional devices are able to operate, in accordance with a result of the detection performed by said first detector means and also the first data items and second data items stored in said memory means, and
   each of said first and second optional devices comprising:
   second data receiving means for receiving the status-requesting commands output by said first output means;
   third detector means for detecting whether one of said first and second optional devices is mounted on the other of said first and second optional devices; and
   second output means for outputting the first data and the second data in response to the status-requesting command received by said second data-receiving means.

5. The image forming system according to claim 4, wherein said second detector means is located at a specific position, and is turned on by a detecting member secured to one of said first and second optional devices, thereby to detect that the other of said first and second optional devices is mounted on said one of said first and second optional devices, regardless of whether the other of said first and second optional devices has been turned on.

6. The image forming system according to claim 4, in which said image forming device has a power-supply switch, and in which said first output means is actuated when said power-supply switch is turned on.

7. An image forming system comprising:
   a first device for forming an image on a paper sheet, said first device comprising a first sheet-discharging section and a second sheet-discharging section, each designed to discharge the paper sheet after the image has been formed on the paper sheet;
   a second device located adjacent to said first device, for handling the paper sheet on which said first device forms an image;
   a third device located adjacent to said second device and remote from said first device, for handling the paper sheet on which said first device forms an image;
   sheet-supplying means incorporated in said first device, for supplying the paper sheet discharged by said first sheet-discharging section, to said third device;
   first detector means incorporated in said third device for detecting whether said second device is placed between said first device and said third device; and
   second detector means incorporated in said second device, for detecting whether said second device is normally operating.

8. The image forming system according to claim 7, wherein said first device has control means for inhibiting said first sheet-discharging section from operating and enabling said second sheet-discharging section to operate, when said first detector means detects that said second device is placed between said first device and said third device and when said second detector means detects that said second device is not operating normally.

9. A sheet transporting apparatus, comprising:
   means for discharging a sheet;
   means for receiving the sheet discharged by the discharging means;
   means, being detachable and located between the discharging means and the receiving means, for transporting the paper sheet from the discharging means to the receiving means;
   first detector means for detecting whether the transporting means is located between the discharging means and the receiving means;
   second detector means for detecting whether the transporting means is enabled to operate; and
   means for allowing the discharging means to discharge the paper sheet when the transporting means is not located between the discharging means and the receiving means or when the first detector means detects that the transporting means is located between the discharging means and receiving means and the second detector means detects that the transporting means is enabled to operate.

10. An image forming system, comprising:
   a first device for forming an image on an image forming medium, the first device having means for discharging the image forming medium on which the image has been formed;

a second device for receiving the image forming medium discharged by the first device;

a third device, being detachable and located between the first device and the second device, for transporting the image forming medium from the first device to the second device:

first detector means for detecting whether the third device is located between the first device and the second device;

second detector means for detecting whether the third device is enabled to operate; and means for allowing the device to discharge the image forming medium when the third device is not located between the first device and the second device or when the first detector means detects that the third device is located between the first device and the second device and the second detector means detects that the third devise is enabled to operate.

* * * * *